(12) United States Patent
Kiuchi et al.

(10) Patent No.: US 11,186,239 B2
(45) Date of Patent: Nov. 30, 2021

(54) GROMMET AND WIRE HARNESS

(71) Applicant: Yazaki Corporation, Tokyo (JP)

(72) Inventors: Masaru Kiuchi, Shizuoka (JP); Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 1 day.

(21) Appl. No.: 16/779,435

(22) Filed: Jan. 31, 2020

(65) Prior Publication Data

US 2020/0276943 A1 Sep. 3, 2020

(30) Foreign Application Priority Data

Feb. 28, 2019 (JP) .............................. JP2019-035043

(51) Int. Cl.
  B60R 16/02 (2006.01)
  H01B 17/58 (2006.01)
(52) U.S. Cl.
  CPC ......... B60R 16/0222 (2013.01); H01B 17/58 (2013.01)
(58) Field of Classification Search
  CPC ............................. B60R 16/0222; H01B 17/58
  See application file for complete search history.

(56) References Cited

U.S. PATENT DOCUMENTS

| | | | | |
|---|---|---|---|---|
| 3,053,564 A * | 9/1962 | Evans | ........................ | B60J 5/04 49/167 |
| 3,633,250 A * | 1/1972 | Romney | ................. | A47F 7/163 403/76 |
| 6,278,060 B1 * | 8/2001 | Mori | .................... | B60R 16/0222 174/650 |
| 6,660,937 B1 * | 12/2003 | MacLeod | ................. | H02G 3/22 174/659 |
| 2001/0008330 A1 * | 7/2001 | Sakata | ................ | B60R 16/0222 277/316 |
| 2002/0038492 A1 * | 4/2002 | Hashimoto | ............... | F16L 5/10 16/2.1 |
| 2009/0028659 A1 * | 1/2009 | Shibuya | ................ | F16B 21/073 411/57.1 |
| 2009/0065235 A1 * | 3/2009 | Uchibori | ............. | B60R 16/0222 174/152 G |
| 2012/0252272 A1 * | 10/2012 | Omae | .................. | H01R 13/506 439/607.01 |

(Continued)

FOREIGN PATENT DOCUMENTS

| | | |
|---|---|---|
| EP | 1 157 894 A1 | 11/2001 |
| JP | 5-83949 U | 11/1993 |

*Primary Examiner* — Timothy J Thompson
*Assistant Examiner* — Rhadames Alonzo Miller
(74) *Attorney, Agent, or Firm* — Kenealy Vaidya LLP

(57) ABSTRACT

A grommet includes: a main body part fitted to a penetration hole penetrating an attachment panel along an axial direction, stops water at the penetration hole, and has a wiring material inserted thereinto along the axial direction; and a tubular part unified with the main body part so as to have a tubular shape, and has the wiring material inserted thereinto. The tubular part includes a halved part formed to have a shape of a part of the tubular part in a circumferential direction, an open part where an inside of the tubular part is open at a position except a position where the halved part is formed in the circumferential direction, and an open/close part formed continuing from the halved part and is able to open and close the open part.

14 Claims, 13 Drawing Sheets

(56) References Cited

U.S. PATENT DOCUMENTS

| | | | |
|---|---|---|---|
| 2015/0041210 A1* | 2/2015 | Inao | B60R 16/0215 |
| | | | 174/72 A |
| 2016/0134090 A1* | 5/2016 | Kushima | H02G 3/0481 |
| | | | 174/362 |
| 2017/0349123 A1* | 12/2017 | Katoh | B60R 16/0222 |
| 2018/0145430 A1* | 5/2018 | Yanai | H01B 7/02 |
| 2019/0089142 A1* | 3/2019 | Sugino | H02G 3/0487 |

* cited by examiner

GROMMET AND WIRE HARNESS

CROSS-REFERENCE TO RELATED APPLICATION(S)

The present application claims priority to and incorporates by reference the entire contents of Japanese Patent Application No. 2019-035043 filed in Japan on Feb. 28, 2019.

BACKGROUND OF THE INVENTION

1. Field of the Invention

The present invention relates to a grommet and a wire harness.

2. Description of the Related Art

One example of the conventionally known grommets to be mounted in a vehicle is disclosed in Japanese Utility Model Application Laid-open No. H5-83949. When a wire harness is inserted into a penetration hole that is open through a vehicle body panel of an automobile or the like, this grommet is disposed between the panel and the wire harness so as to achieve sealing. This grommet includes a panel engaging part, a tubular part for inserting the wire harness, a cut part, an engaging concave part, and an engaging convex part. The panel engaging part includes a large-diameter flange that is engaged with an engaging hole of the panel. The tubular part for inserting the wire harness protrudes from an outer periphery of a central hole of the panel engaging part so as to be integrally molded with the large-diameter flange. The cut part is formed in a manner that the grommet is cut along an axial direction from an end of the tubular part to an end of the panel engaging part so that the grommet can be opened to both sides. The engaging concave part and the engaging convex part are formed on opposite surfaces of the cut part and can be engaged with each other when the opposite surfaces are bonded together.

Here, the grommet is also disposed for the purpose of stopping water from flowing from one space side to the other space side, the spaces being sectioned by a vehicle body panel. In order to efficiently stop water, it is necessary to extend a part that covers the wire harness. However, if the part that covers the wire harness is extended long, it becomes difficult to pass a leading member through the grommet and the workability in assembling the wire harness may deteriorate.

SUMMARY OF THE INVENTION

The present invention has been made in view of the above circumstance, and an object is to provide a grommet and a wire harness that can improve the water stopping performance while suppressing the deterioration in workability in assembling the grommet.

In order to solve the above mentioned problem and achieve the object, a grommet according to one aspect of the present invention includes a main body part that is fitted to a penetration hole penetrating an attachment target along an axial direction, stops water at the penetration hole, and has a wiring material inserted thereinto along the axial direction; and a tubular part that is unified with the main body part so as to have a tubular shape, and has the wiring material inserted thereinto along the axial direction, wherein the tubular part includes: a halved part that is formed to have a shape of a part of the tubular part in a circumferential direction; an open part where an inside of the tubular part is open at a position except a position where the halved part is formed in the circumferential direction; and an open/close part that is formed continuing from the halved part in the circumferential direction and is able to open and close the open part.

According to another aspect of the present invention, in the grommet, it is preferable that the open/close part is formed to have a halved shape corresponding to the open part.

According to still another aspect of the present invention, in the grommet, it is preferable that the open/close part has flexibility and, by being wound around the wiring material, the open/close part is formed into the tubular shape together with the halved part.

According to still another aspect of the present invention, in the grommet, it is preferable that the open/close part overlaps partially with the halved part in a radial direction of the tubular part in a state where the open part is closed.

According to still another aspect of the present invention, in the grommet, it is preferable that the open/close part is one of open/close parts disposed on both sides of the halved part in the circumferential direction, and the open/close parts disposed on both sides of the halved part may overlap with each other partially in the radial direction of the tubular part in a state where the open part is closed.

According to still another aspect of the present invention, in the grommet, it is preferable that the tubular part includes: a cylindrical part positioned between the main body part and the halved part; a groove part formed along the circumferential direction; and a convex part that is formed along the circumferential direction and enters the groove part in the state where the open part is closed by the open/close part, and the groove part may be provided to one of the cylindrical part and the open/close part and the convex part is provided to the other.

In order to achieve the above mentioned object and achieve the object, according to still another aspect of the present invention a wire harness includes a wiring material having conductivity; and a grommet provided to the wiring material, wherein the grommet includes: a main body part that is fitted to a penetration hole penetrating an attachment target along an axial direction, stops water at the penetration hole, and has the wiring material inserted thereinto along the axial direction; and a tubular part that is unified with the main body part so as to have a tubular shape, and has the wiring material inserted thereinto along the axial direction, and the tubular part includes: a halved part that is formed to have a shape of a part of the tubular part in a circumferential direction; an open part where an inside of the tubular part is open at a position except a position where the halved part is formed in the circumferential direction; and an open/close part that is formed continuing from the halved part in the circumferential direction and is able to open and close the open part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are hereinafter described in detail with reference to the drawings. Note that the present invention is not limited by these embodiments. The components to be described in the embodiments below include the component that can be replaced easily by a person skilled in the art or that is substantially the same.

First Embodiment

Figure 1:
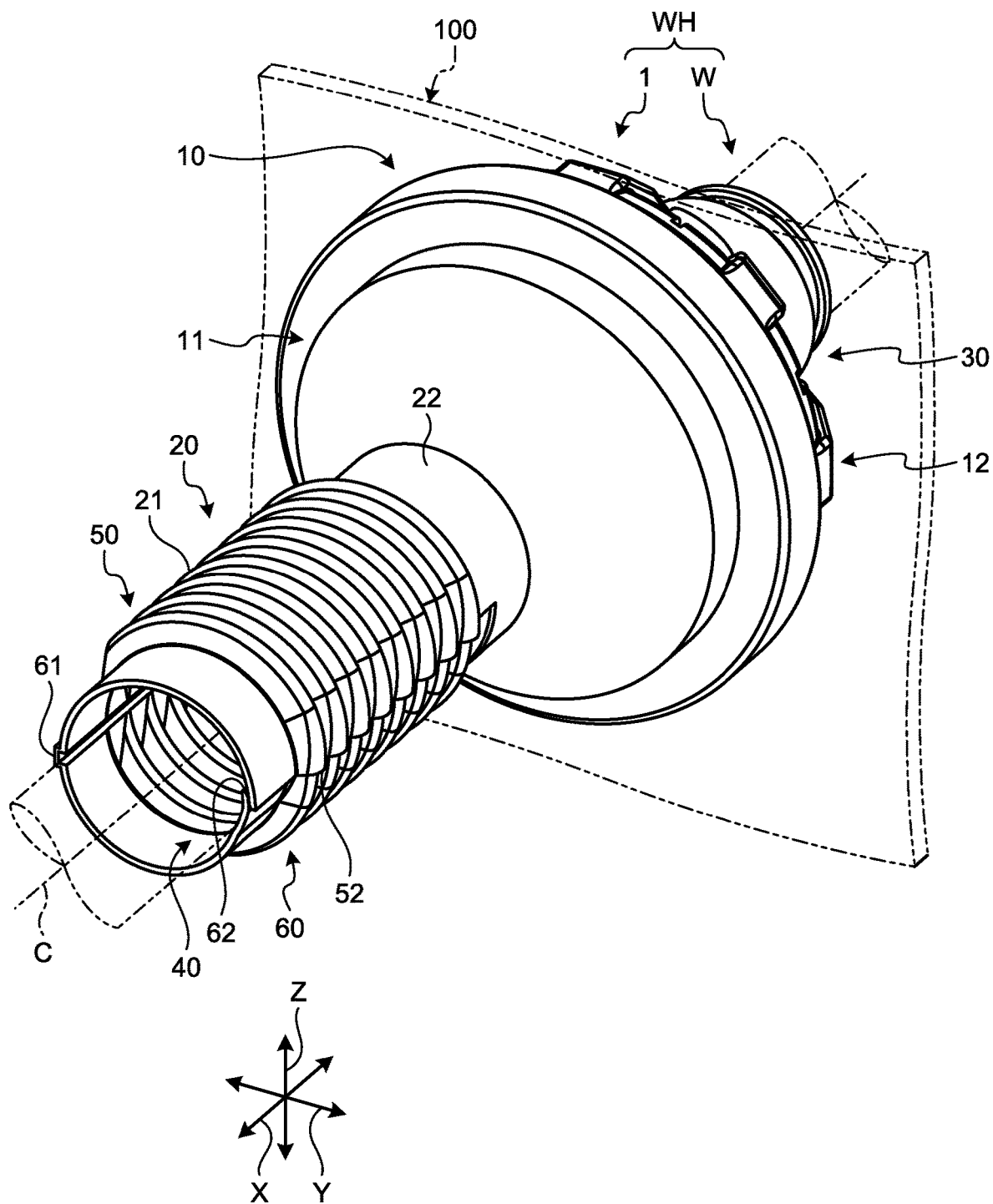
FIG. 1 is a perspective view illustrating a schematic structure of a wire harness in which a grommet according to a first embodiment is used.
Figure 2:
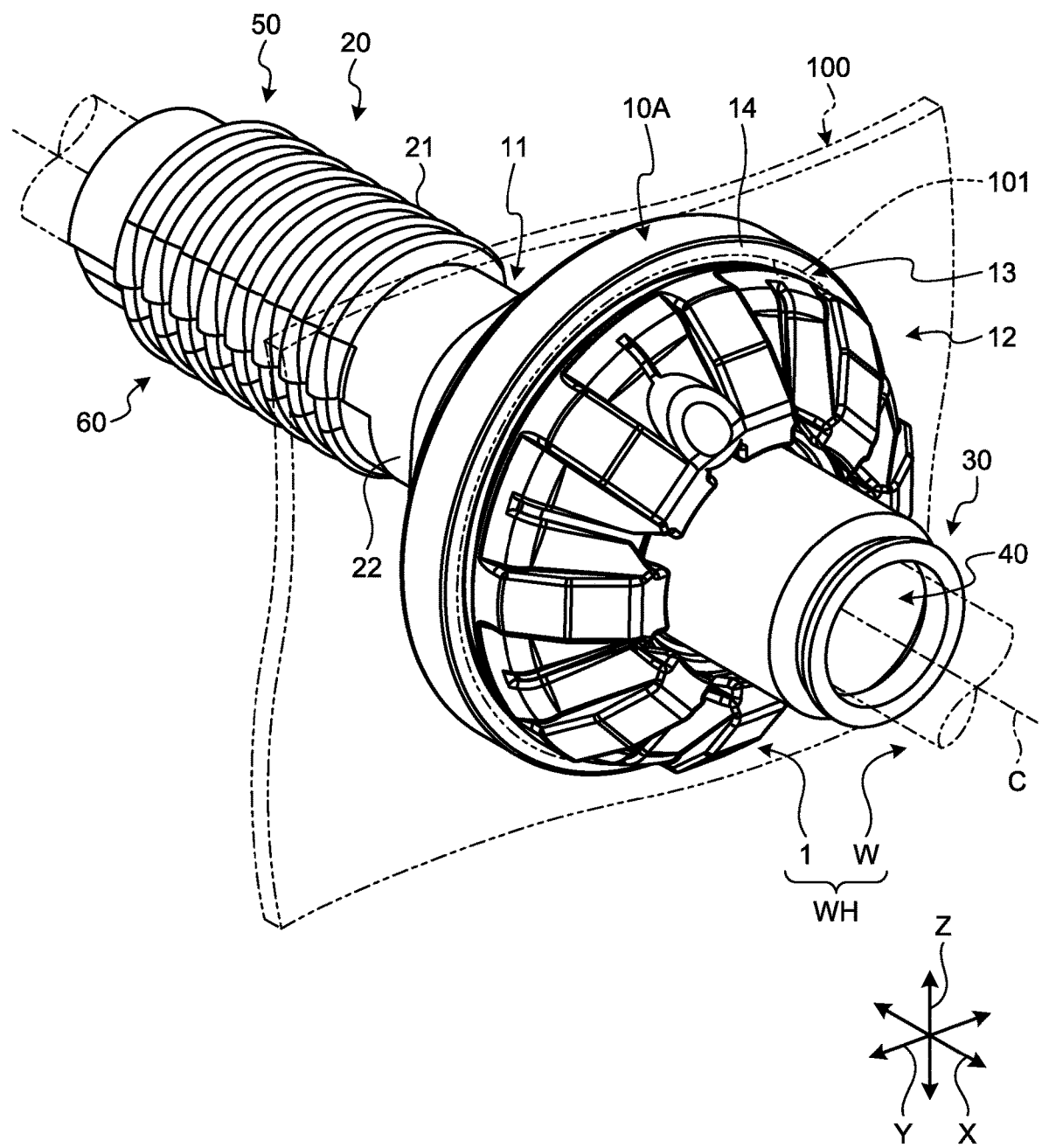
FIG. 2 is a perspective view illustrating the schematic structure of the wire harness in which the grommet according to the first embodiment is used.
Figure 3:
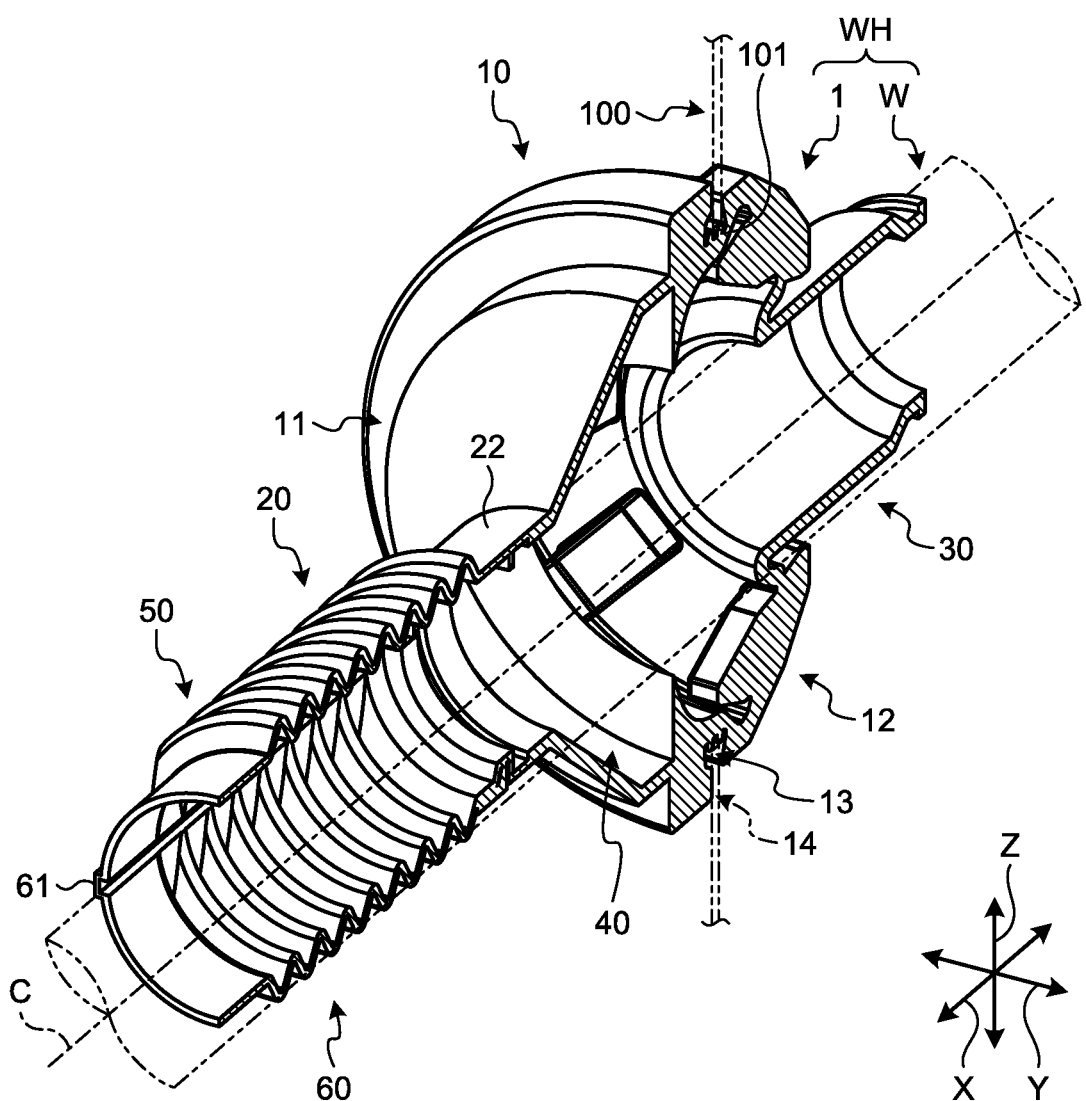
FIG. 3 is a cross-sectional perspective view illustrating the schematic structure of the wire harness in which the grommet according to the first embodiment is used.

A grommet 1 according to a first embodiment that is illustrated in FIG. 1, FIG. 2, and FIG. 3 is incorporated in a wire harness WH that is wired in a vehicle or the like. The wire harness WH is formed in a manner that, for example, a plurality of wiring materials W used in the connection between devices to be mounted in the vehicle for power supply or signal communication are bundled into an assembly, and the wiring materials W are connected to each device with a connector or the like. The wire harness WH includes the wiring material W that is conductive and the grommet 1 that is provided to the wiring material W and has the wiring material W inserted thereinto. The wire harness WH may further include various components, for example, an exterior member such as a corrugate tube, a resin tape, or a protector, an electrical connection box, and a fixing tool. The wiring material W is formed of, for example a metal bar, an electric wire, an electric wire bundle, or the like. The metal bar is a conductive bar-like member externally covered with an insulating covering part. The electric wire is a conductor (core wire) formed of a plurality of conductive metal strands that is externally covered with an insulating covering part. The electric wire bundle is a bundle of the electric wires. The wire harness WH bundles and unifies the wiring materials W and electrically connects between the devices through connectors or the like provided at terminals of the bundled wiring materials W.

When the wiring material W is wired across two spaces that are sectioned with an attachment panel 100, which corresponds to an attachment target, as a border through a penetration hole 101 provided to the attachment panel 100, the grommet 1 is used in the penetration hole 101. The attachment panel 100 is, for example, a metal plate that forms a body of the vehicle, and the penetration hole 101 penetrates the attachment panel 100 along a plate thickness direction. The two spaces that are sectioned with the attachment panel 100 as the border are typically a space in the vehicle (for example, cabin) and a space outside the vehicle (for example, engine compartment). The grommet 1 is assembled to the penetration hole 101 in a state where the wiring material W of the wire harness WH is inserted into the grommet 1 and the grommet 1 is externally attached to the wiring material W; thus, the grommet 1 protects the wiring material W that passes the penetration hole 101 and stops water (is waterproof) at the penetration hole 101. The grommet 1 also has functions of preventing dust and blocking noise in addition to the waterproof function for the penetration hole 101, for example. The structure of the grommet 1 is described in detail with reference to each drawing.

Note that the attachment panel 100 is roughly drawn with a two-dot chain line in FIG. 1, FIG. 2, and FIG. 3, and not drawn in the other drawings. In addition, in each drawing, the wiring material W and the attachment panel 100 are each drawn roughly with a two-dot chain line. Among a first direction, a second direction, and a third direction that are orthogonal to each other in the description below, the first direction is referred to as "axial direction X", the second direction is referred to as "width direction Y", and the third direction is referred to as "height direction Z". The axial direction X, the width direction Y, and the height direction Z are typically orthogonal to each other. Here, the axial direction X corresponds to the plate thickness direction of the attachment panel 100 described above, and also corresponds to the direction where the wiring material W and the grommet 1 are inserted into the penetration hole 101. In other words, the axial direction X is the direction along the direction where the wiring material W inserted into the grommet 1 is extended, and the penetration hole 101 of the attachment panel 100 penetrates the attachment panel 100 along the axial direction X. The width direction Y and the height direction Z correspond to the direction where the attachment panel 100 is extended. In the description here, the wiring material W is wired linearly along the axial direction X for the convenience in order to help understanding; however, the structure is not limited thereto. In another example, in a state where the grommet 1 is attached to the attachment panel 100, the axial direction X may be a bent direction and the grommet 1 and the wiring material W may be bent partially. The directions to be described below correspond to the directions in the state where the grommet 1 is assembled to the attachment panel 100 unless otherwise stated.

Specifically, the grommet 1 according to the first embodiment is a sealing member that has the wiring material W inserted inside along the axial direction X and can stop water at the penetration hole 101 in the attachment panel 100 as illustrated in FIG. 1, FIG. 2, and FIG. 3. The grommet 1 includes a main body part 10, a tubular part 20, and a tubular part 30, and is formed as an elastic body in which these parts are unified. The grommet 1 is formed of, for example, an insulating elastic resin material that has low rigidity and high flexibility, such as rubber or thermoplastic elastomer (for example, ethylene-propylene-diene rubber (EPDM)).

The main body part 10 is a part that is fitted to the penetration hole 101, stops water at the penetration hole 101, and has the wiring material W inserted thereinto along the axial direction X. The main body part 10 includes a first expansion part 11, a second expansion part 12, a fitting groove part 13, and a lip part 14.

The first expansion part 11 and the second expansion part 12 are each formed to have an annular shape, here a tubular shape, with a central axial line C thereof extended along the axial direction X. The first expansion part 11 and the second expansion part 12 face each other with a space therebetween along the axial direction X and are unified at an outer peripheral part 10A. Here, the outer peripheral part 10A is a part that connects to both the first expansion part 11 and the second expansion part 12 at a position near each outer end in a radial direction (direction orthogonal to the central axial line C).

The first expansion part 11 and the second expansion part 12 are each formed to have a shape that expands outward along the axial direction X. The first expansion part 11 and the second expansion part 12 are each formed to have a hollow dome shape as a whole while being unified at the outer peripheral part 10A. The first expansion part 11 is connected to the tubular part 20 on a surface of the first expansion part 11 that is opposite to a surface thereof on the second expansion part 12 side in the axial direction X. The second expansion part 12 is connected to the tubular part 30 on a surface of the second expansion part 12 that is opposite to a surface thereof on the first expansion part 11 side in the axial direction X.

The fitting groove part 13 is a groove that is provided to the outer peripheral part 10A where the first expansion part 11 and the second expansion part 12 are unified. The fitting groove part 13 is formed in the outer peripheral part 10A as an annular groove part with the central axial line C as a center. With the main body part 10 fitted to the penetration hole 101, an end part of the attachment panel 100 that forms the penetration hole 101 is fitted to the fitting groove part 13.

The lip part 14 is a water stopping part with a pleated shape that is formed along the fitting groove part 13. Here, the lip part 14 is formed to have an annular shape along the fitting groove part 13 at an end part of the fitting groove part 13 on the first expansion part 11 side. That is to say, the lip part 14 is provided to the fitting groove part 13 and has an annular shape with the central axial line C as the center. While the end part of the penetration hole 101 is fitted to the fitting groove part 13, the lip part 14 is in contact with the surface of the end part (here, the surface on the first expansion part 11 side) and stops water at the surface. The lip part 14 is in close contact with the surface of the end part that forms the penetration hole 101 by the elastic deformation, and seals the entire periphery of the penetration hole 101.

The tubular parts 20 and 30 are the parts that are unified with the main body part 10, are formed to have the tubular shape, and have the wiring material W inserted thereinto along the axial direction X.

The tubular part 20 is formed to protrude from the first expansion part 11 to one side (opposite to the second expansion part 12 side) along the axial direction X. The tubular part 20 is formed to have a cylindrical shape with the central axial line C as the center and is extended along the axial direction X. The tubular part 20 is formed to have a cylindrical shape with the diameter smaller than that of a large part of the first expansion part 11. The tubular part 20 has one end part in the axial direction X open and the other end connected to the first expansion part 11. The tubular part 20 is connected at an approximately central position of the first expansion part 11 with respect to the width direction Y and the height direction Z. The tubular part 20 includes a bellows part 21. The bellows part 21 is formed in a manner that a part of the tubular part 20 in the axial direction X is formed in the bellows shape. That is to say, the bellows part 21 is formed in a manner that a part of the tubular part 20 in the axial direction X alternately becomes a large-diameter part and a small-diameter part toward one direction of the axial direction X. By having the bellows part 21, the tubular part 20 can bend easily at the position of the bellows part 21. Note that the structure of this tubular part 20 is described in detail below.

The tubular part 30 is formed to protrude from the second expansion part 12 to one side (opposite to the first expansion part 11 side) along the axial direction X. The tubular part 30 is formed to have a cylindrical shape with the central axial line C as the center and is extended along the axial direction X. The tubular part 30 is formed to have a cylindrical shape with the diameter smaller than that of a large part of the second expansion part 12. The tubular part 30 has one end part in the axial direction X open and the other end connected to the second expansion part 12. The tubular part 30 is connected at an approximately central position of the second expansion part 12 with respect to the width direction Y and the height direction Z.

In the grommet 1 with the above structure, an internal space part formed by the main body part 10, the tubular part 20, and the tubular part 30 functions as an insertion space part 40. The insertion space part 40 is a space part where the wiring material W is inserted, and continues along the tubular part 20, the main body part 10, and the tubular part 30 along the axial direction X. In the grommet 1, the wiring material W is inserted along the axial direction X into the insertion space part 40 that is formed to communicate with the tubular part 20, the main body part 10, and the tubular part 30.

The grommet 1 is attached to the wiring material W in a manner that the wiring material W is inserted into the insertion space part 40, and then, together with the terminal of the wiring material W, the tubular part 20 or the tubular part 30 is inserted into the penetration hole 101. Then, as the main body part 10 is fitted to the penetration hole 101 so that the end part of the penetration hole 101 is fitted to the fitting groove part 13 of the main body part 10, the grommet 1 is assembled to the attachment panel 100. When the grommet 1 is in this state, the lip part 14 is in close contact with the surface of the periphery of the penetration hole 101 while the lip part 14 is elastically deformed, and thus, the entire periphery of the penetration hole 101 is sealed. The grommet 1 may stop water at the opening of the tubular parts 20 and 30 in a manner that a winding tape or the like is wound along the wiring material W inserted into the insertion space part 40, the tubular parts 20 and 30, and the wiring material W.

Figure 4:
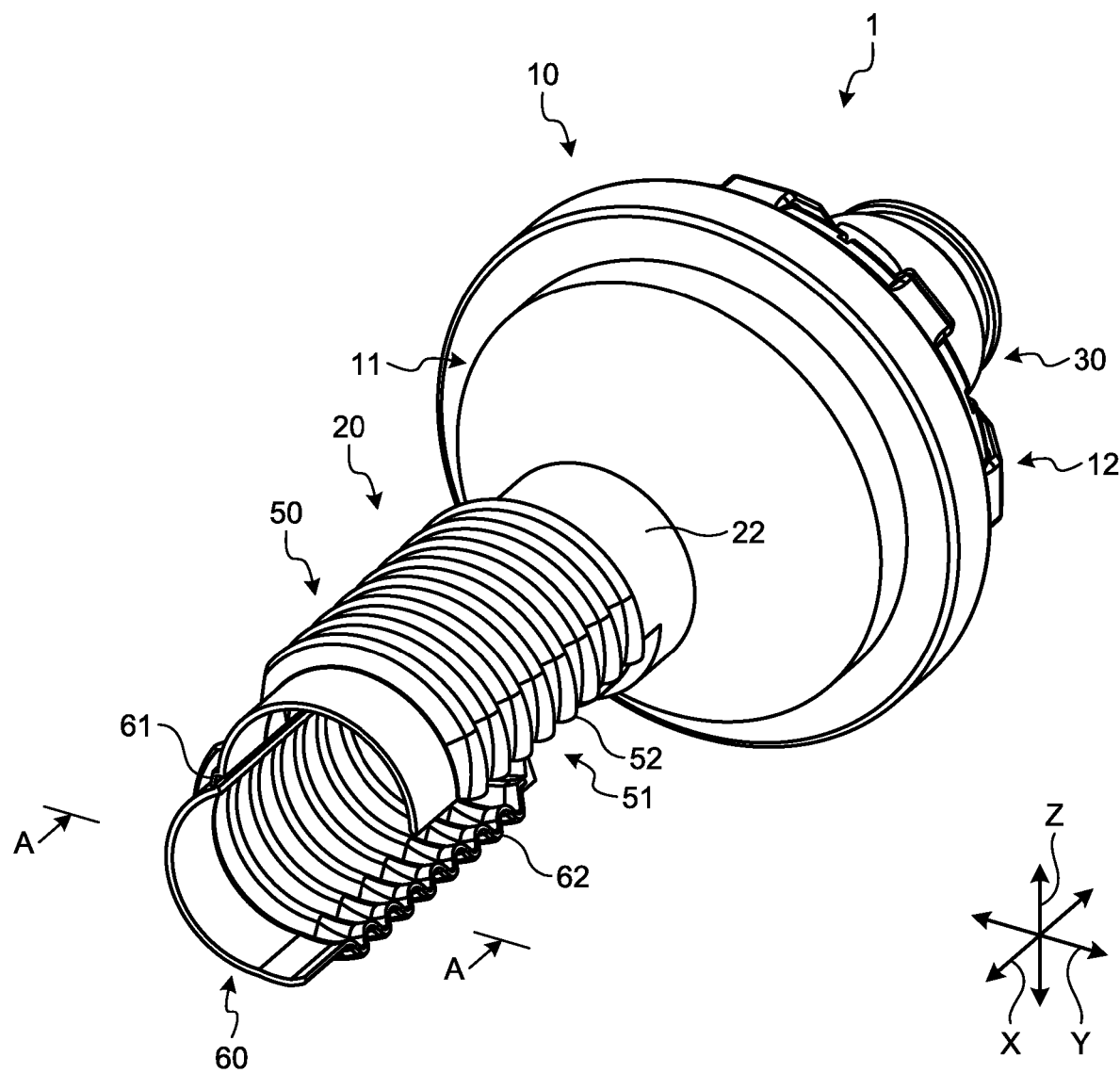
FIG. 4 is a perspective view illustrating a state in which an open/close part of the grommet illustrated in FIG. 1 is open.
Figure 5:
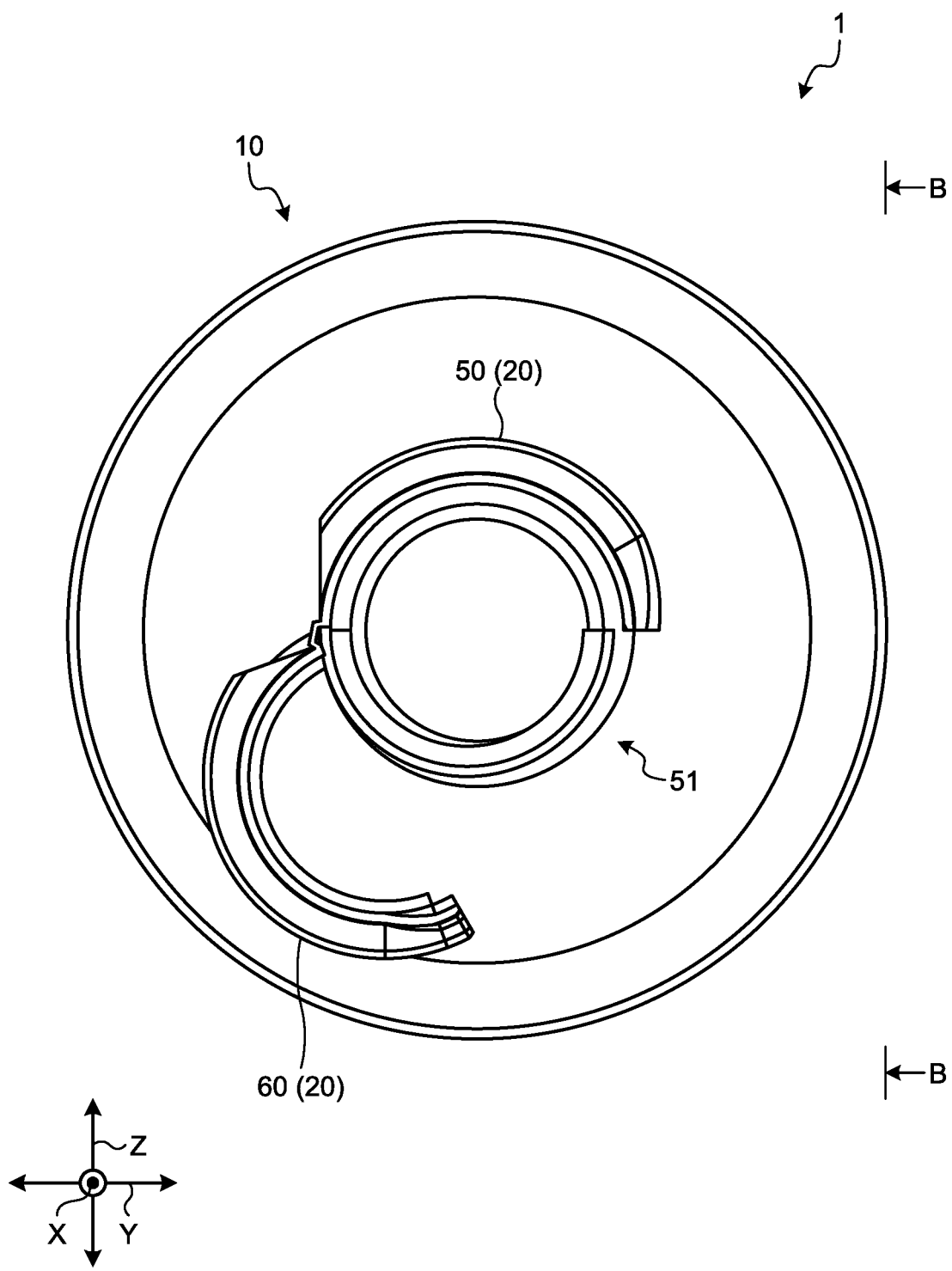
FIG. 5 is an arrow view taken along A-A in FIG. 4.
Figure 6:
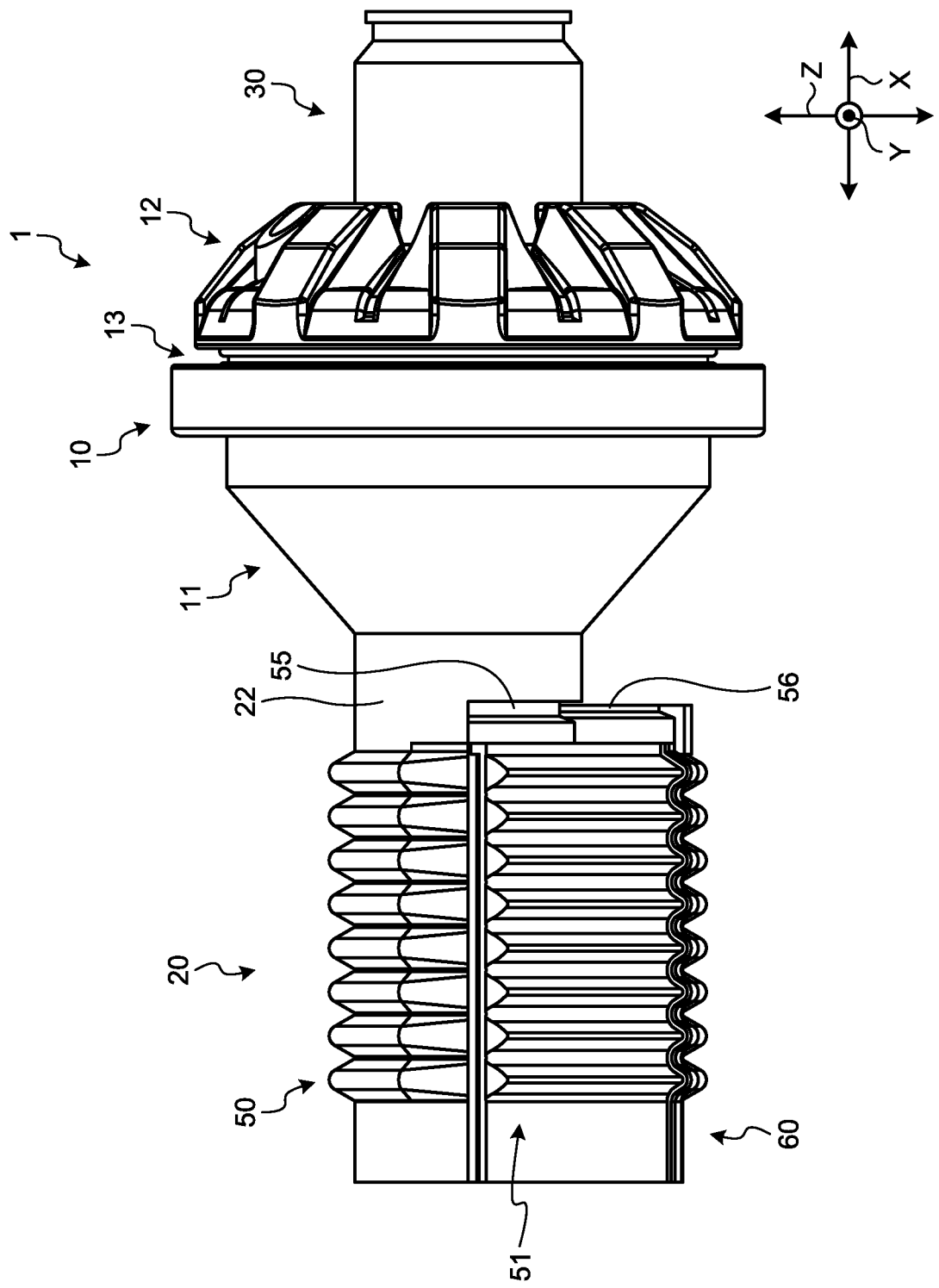
FIG. 6 is an arrow view taken along B-B in FIG. 5.

Next, the tubular part 20 is described in detail. The tubular part 20 includes a halved part 50, an open part 51, and an open/close part 60. FIG. 4 is a perspective view illustrating a state in which the open/close part 60 of the grommet 1 illustrated in FIG. 1 is open. FIG. 5 is an arrow view taken along A-A in FIG. 4. FIG. 6 is an arrow view taken along B-B in FIG. 5. The halved part 50 is a part that forms a predetermined range of the tubular part 20 in a circumferential direction with the central axial line C as the center. In the first embodiment, the halved part 50 is a part that forms the range of about 180° of the tubular part 20 in the circumferential direction with the central axial line C as the center, and is formed to have an approximately semi-cylindrical shape. At a position of the tubular part 20 including the halved part 50 except the position where the halved part 50 is formed in the circumferential direction with the central axial line C as the center, the open part 51 where the inside of the tubular part 20 is open is formed.

In addition, the open/close part 60 is formed continuously from the halved part 50 in the circumferential direction of the tubular part 20 with the central axial line C as the center, and is able to open and close the open part 51. Specifically, the open/close part 60 is formed to have an approximately semi-cylindrical shape like the halved part 50, that is, the open/close part 60 is formed to have a halved shape corresponding to the open part 51. The open/close part 60 has one end in the circumferential direction connected to one end of the halved part 50 in the circumferential direction. That is to say, the open/close part 60 is disposed at one end side of the halved part 50 in the circumferential direction of the tubular part 20. A connection part 61 corresponding to a part of the open/close part 60 that is connected to the halved part 50 is extended along the axial direction X, and the open/close part 60 is rotatable with the connection part 61 as the center.

The halved part 50 and the open/close part 60 are formed apart by a predetermined length from the position where the tubular part 20 is connected to the first expansion part 11 to a direction away from the first expansion part 11 along the axial direction X. That is to say, the tubular part 20 includes a cylindrical part 22 that is formed to have an approximately cylindrical shape with the central axial line C as the center at the position between the main body part 10 and the halved part 50, and the halved part 50 is formed on the side opposite to the side where the cylindrical part 22 is connected to the main body part 10 in the axial direction X. The position of a part of the open/close part 60 that is close to the cylindrical part 22 in the axial direction X includes the range where the cylindrical part 22 is formed.

The tubular part 20 moreover includes a groove part 55 that is formed along the circumferential direction of the tubular part 20 with the central axial line C as the center, and a convex part 56 that enters the groove part 55 with the open part 51 closed by the open/close part 60. The groove part 55 is formed on the outer peripheral surface side at the position of the cylindrical part 22 that is close to the open part 51 in the axial direction X, that is, the groove part 55 is formed in the part of the cylindrical part 22 where the cylindrical part 22 overlaps with the open/close part 60 in the axial direction X. Note that the convex part 56 is formed on the inner peripheral surface side at the position of the open/close part 60 that is close to the cylindrical part 22 in the axial direction X, that is, the convex part 56 is formed in the part of the open/close part 60 where the open/close part 60 overlaps with the cylindrical part 22 in the axial direction X. Therefore, the convex part 56 can enter the groove part 55 with the open part 51 closed by the open/close part 60.

When the wiring material W is inserted into the grommet 1 with the aforementioned structure, the wiring material W is inserted, with the open part 51 opened by the open/close part 60. Specifically, before the wiring material W is inserted into the grommet 1, a tool (not shown) that can increase the size of the insertion space part 40 is inserted into the insertion space part 40. After the size of the insertion space part 40 in a predetermined direction that intersects the axial direction X is increased, the wiring material W is inserted.

In this case, by keeping the open/close part 60 open, the grommet 1 can shorten the length of the part that is tubular in the axial direction X. That is to say, by keeping the open/close part 60 open, the grommet 1 does not become tubular in the range where the halved part 50 is formed in the axial direction X; therefore, the part that is tubular can be shortened. Accordingly, the tool can be inserted more easily and with this tool, the size of the insertion space part 40 in the predetermined direction can be increased easily. With the size of the insertion space part 40 of the grommet 1 increased by the tool, the wiring material W is inserted into the insertion space part 40.

After the wiring material W is inserted into the insertion space part 40 of the grommet 1, the open/close part 60 is rotated using the connection part 61 as the center, so that the open/close part 60 makes the open part 51 closed (see FIG. 1, FIG. 2, and FIG. 3). Thus, the part of the grommet 1 that is tubular becomes long in the axial direction X; therefore, the wiring material W can be covered with the large length and the wider range of the wiring material W can be covered with the grommet 1.

In the state where the open part 51 is closed by the open/close part 60, a part of the open/close part 60 and a part of the halved part 50 overlap with each other in the radial direction of the tubular part 20. That is to say, while the open part 51 is closed, an end part 52 of the halved part 50 and an end part 62 of the open/close part 60, the end parts being positioned opposite to the end parts where the connection part 61 is disposed in the circumferential direction with the central axial line C as the center, are overlapped with each other in the radial direction of the tubular part 20. The open/close part 60 closes the open part 51 with the part of the open/close part 60 and the part of the halved part 50 overlapped.

Moreover, when the open part 51 is closed by the open/close part 60, a part of the open/close part 60 that is close to the cylindrical part 22 covers the cylindrical part 22 from the outside in the radial direction. In this case, the convex part 56 of the open/close part 60 enters the groove part 55 provided to the cylindrical part 22. That is to say, the open/close part 60 closes the open part 51 as the convex part 56 is guided into the groove part 55.

After the open part 51 is closed by the open/close part 60 to cover the wiring material W with the halved part 50 and the open/close part 60, an adhesive tape is continuously wound from outside the tubular part 20 and the wiring material W. Thus, the tubular part 20 and the wiring material W are unified.

In the grommet 1 and the wire harness WH according to the first embodiment described above, the tubular part 20 of the grommet 1 includes the halved part 50, the open part 51, and the open/close part 60. Therefore, by keeping the open part 51 open by the open/close part 60 when the grommet 1 is attached to the wiring material W, the grommet 1 can be attached while the part of the tubular part 20 that is tubular is shortened. Thus, the attachment is facilitated. As a result, the workability in attaching the grommet 1 can be improved.

In addition, by closing the open part 51 with the open/close part 60 after the grommet 1 is attached to the wiring material W in a manner that the wiring material W is inserted into the grommet 1, the part that is tubular in the tubular part 20 can be extended. Thus, when the grommet 1 or the wire harness WH is used, the wiring material W can be covered in the state where the part that is tubular in the tubular part 20 is extended long. Accordingly, the grommet 1 can prevent the water from entering the insertion space part 40 more certainly. As a result, the water stopping performance can be improved while the deterioration in workability in assembling the grommet 1 is suppressed.

In addition, since the open/close part 60 is formed to have the halved shape in accordance with the open part 51, the open part 51 can be easily and certainly opened and closed. As a result, the water stopping performance can be improved while the deterioration in workability in assembling the grommet 1 is suppressed more certainly.

In the state where the open part 51 is closed by the open/close part 60, the part of the open/close part 60 and the part of the halved part 50 overlap with each other in the radial direction of the tubular part 20. Therefore, the water entry into the insertion space part 40 from the outside of the tubular part 20 through a surface common to the halved part 50 and the open/close part 60 can be suppressed. As a result, the water stopping performance can be improved more certainly.

When the open part 51 is closed by the open/close part 60, the convex part 56 provided to the open/close part 60 enters the groove part 55 provided to the cylindrical part 22. Therefore, even if water enters the insertion space part 40, the water does not easily go to the axial direction X over the position where the convex part 56 is formed. As a result, the water stopping performance can be improved more certainly.

Second Embodiment

The grommet 1 according to a second embodiment has a structure similar to that of the grommet 1 according to the first embodiment except that the open/close part 60 has flexibility. Since the other structure is similar to that of the first embodiment, the description of the similar structure is omitted and the same component is denoted by the same reference symbol.

Figure 7:
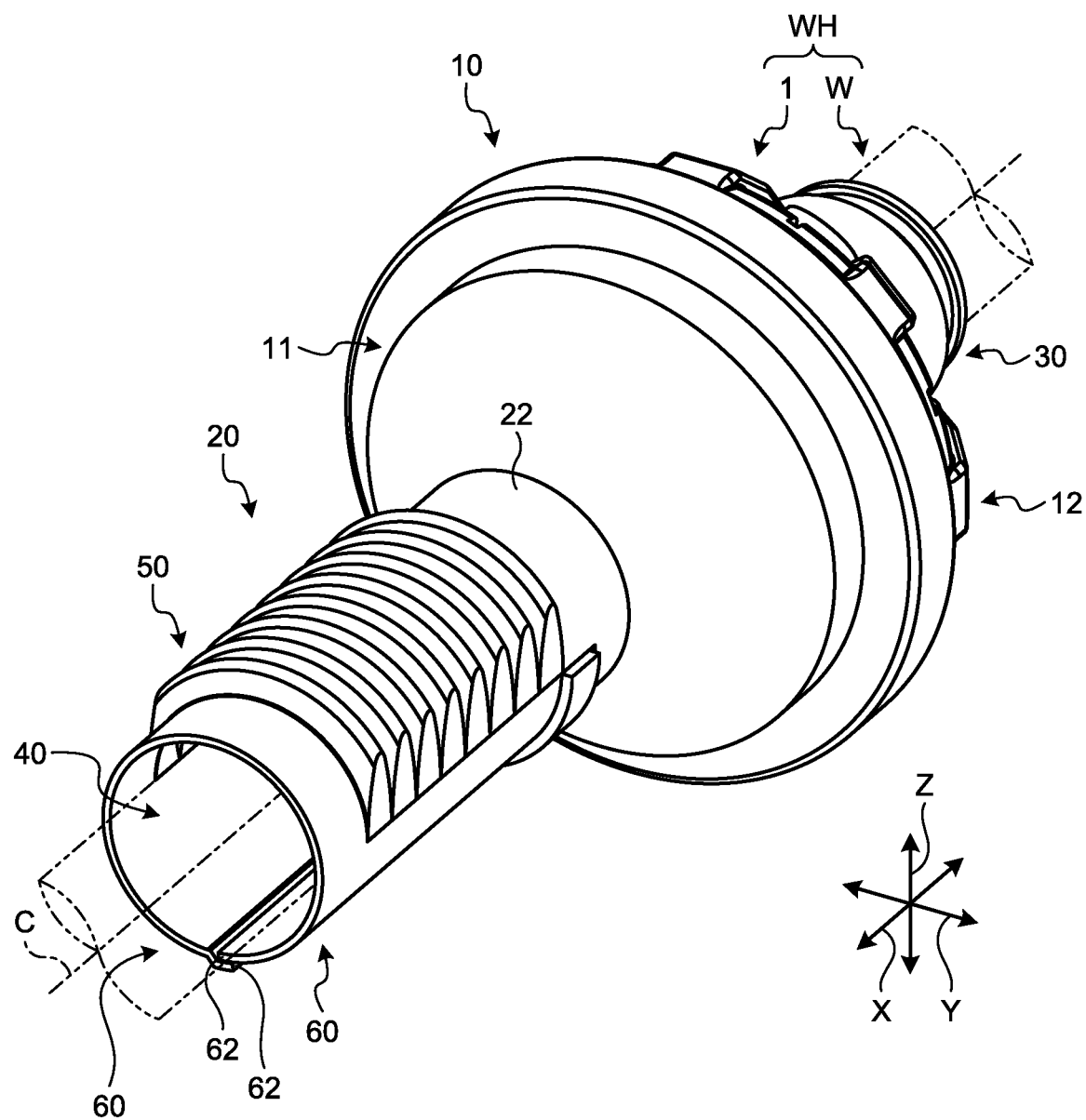
FIG. 7 is a perspective view illustrating a grommet according to a second embodiment.

FIG. 7 is a perspective view of the grommet 1 according to the second embodiment. The grommet 1 according to the second embodiment includes the main body part 10 and the tubular part 20, and the tubular part 20 includes the halved part 50, the open part 51, and the open/close part 60, which is similar to the structure of the grommet 1 according to the first embodiment. Among these components, the open/close part 60 is disposed on each of both sides of the halved part 50 in the circumferential direction of the tubular part 20.

Figure 8:
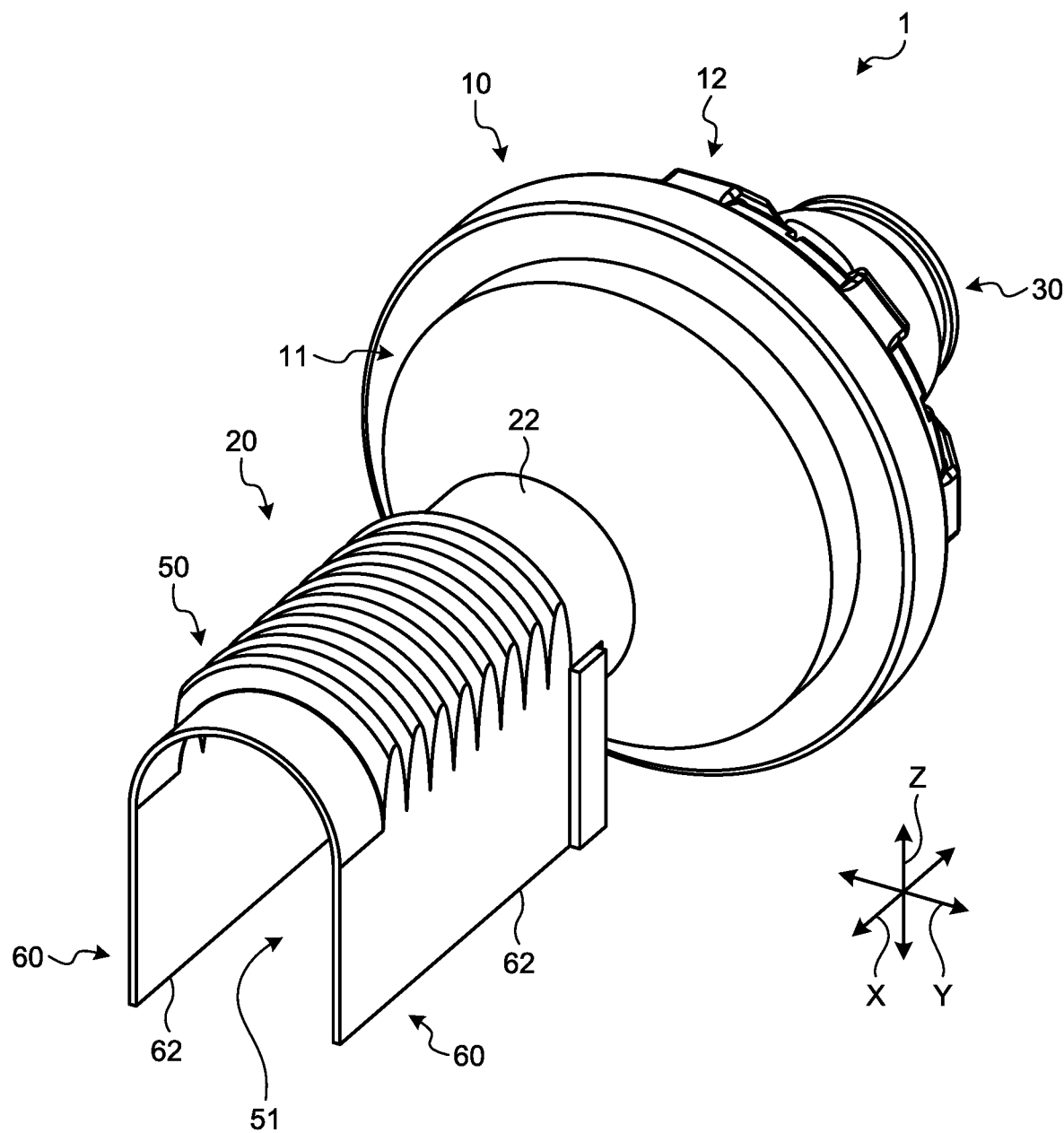
FIG. 8 is a perspective view illustrating a state in which an open/close part illustrated in FIG. 7 is open.
Figure 9:
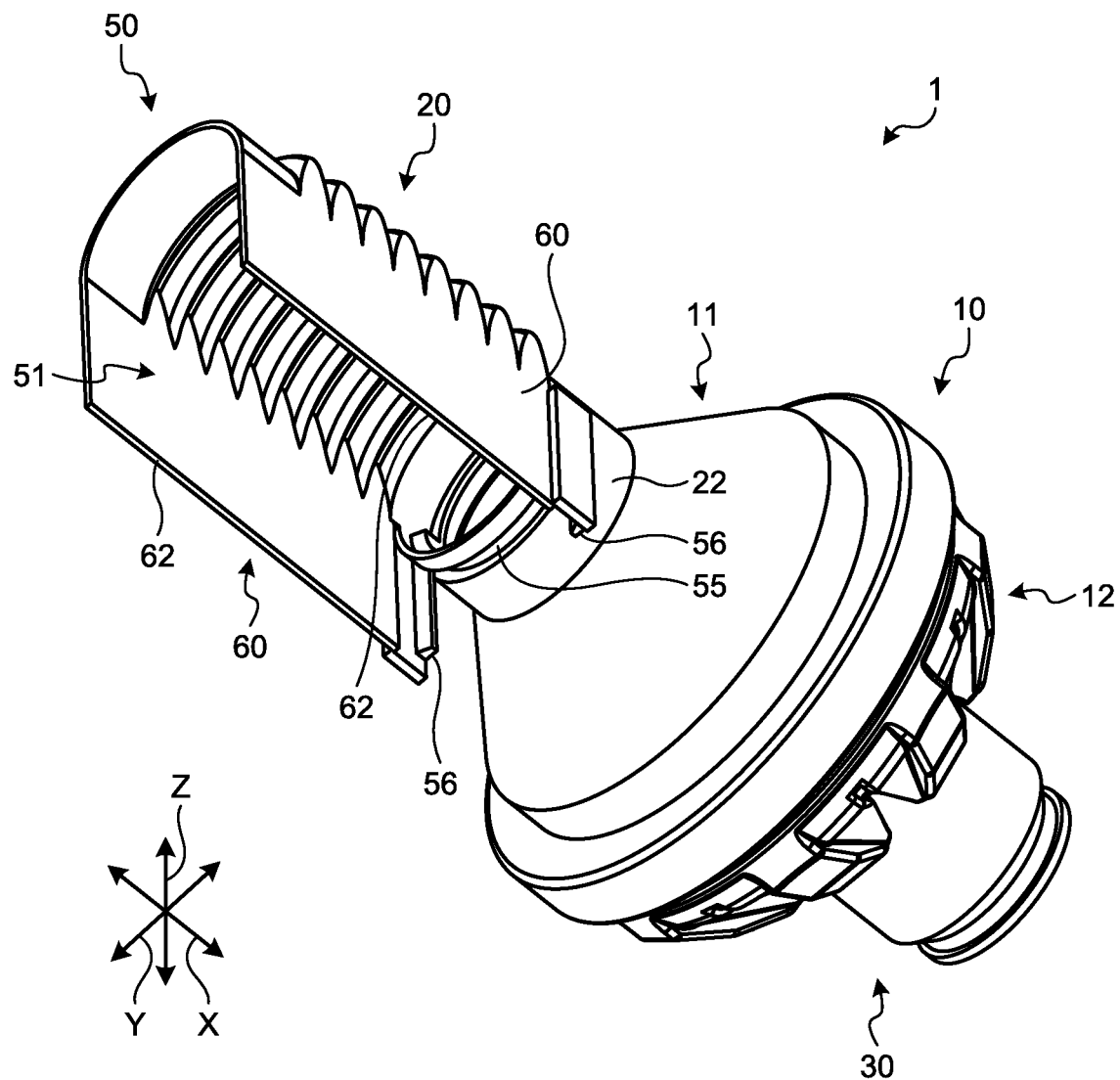
FIG. 9 is a perspective view illustrating the grommet illustrated in FIG. 8 that is viewed from an open part side.

FIG. 8 is a perspective view in which the open/close part 60 in FIG. 7 is open. FIG. 9 is a perspective view of the grommet 1 in FIG. 8 that is viewed from the open part 51 side. The grommet 1 according to the second embodiment is different from that of the first embodiment in that the open/close part 60 is formed to have a plate shape and has flexibility. Therefore, when the open part 51 is opened by the open/close part 60, the open/close part 60 is formed to have the plate shape continuously from the halved part 50 on each side of the halved part 50 in the circumferential direction of the tubular part 20. The position of a part of the open/close part 60 that is close to the cylindrical part 22 in the axial direction X includes the range where the cylindrical part 22 is formed.

In addition, the convex part 56 is formed at each of the open/close parts 60 at two positions that are close to the cylindrical part 22 in the axial direction X. The cylindrical part 22 includes the groove part 55. The groove part 55 is formed on the outer peripheral surface side of the cylindrical part 22 at the position that is close to the open part 51 in the axial direction X along the circumferential direction of the tubular part 20 with the central axial line C as the center. Note that the convex part 56 of the open/close part 60 is provided on the inner peripheral surface side that is formed when the open/close part 60 is closed, and is formed in the part where the open/close part 60 overlaps with the cylindrical part 22 in the axial direction X. Therefore, the convex part 56 of the open/close part 60 can enter the groove part 55 with the open part 51 closed by the open/close part 60.

In the second embodiment, when the wiring material W is inserted into the grommet 1, the wiring material W is inserted, with the open part 51 opened by the open/close part 60. Thus, the length of the part of the tubular part 20 that is tubular in the axial direction X can be shortened. Accordingly, the tool that is used to insert the wiring material W into the grommet 1 can be inserted more easily into the insertion space part 40, and with this tool, the size of the insertion space part 40 in the predetermined direction can be increased easily. After the size of the insertion space part 40 of the grommet 1 is increased by the tool, the wiring material W is inserted into the insertion space part 40.

After the wiring material W is inserted into the insertion space part 40 of the grommet 1, the open part 51 is closed by the open/close part 60 (see FIG. 7). In the second embodiment, when the open part 51 is closed by the open/close part 60, both the open/close parts 60 with flexibility at the two positions are bent along the circumferential direction of the tubular part 20 and wound around the wiring material W. Thus, the open/close parts 60 and the halved part 50 are formed into the tubular shape together and the open part 51 is closed by the open/close part 60. Therefore, since the part of the grommet 1 that is tubular in the axial direction X becomes long, the wiring material W can be covered with the large length and thus, a wider area of the wiring material W can be covered with the grommet 1.

While the open part 51 is closed, the open/close parts 60 disposed on both sides of the halved part 50 overlap with each other partially in the radial direction of the tubular part 20. That is to say, in the state where the open part 51 is closed, the end parts 62 of the open/close parts 60 disposed on both sides of the halved part 50, the end parts being positioned opposite to the end parts that are connected to the halved part 50 in the circumferential direction with the central axial line C as the center, are overlapped with each other in the radial direction of the tubular part 20. The open/close part 60 closes the open part 51 with the parts of the open/close parts 60 at the two positions overlapped with each other.

In addition, when the open part 51 is closed by the open/close part 60, a part of the open/close parts 60 at the two positions that is close to the cylindrical part 22 covers the cylindrical part 22 from the outside in the radial direction. In this case, the convex part 56 of the open/close part 60 enters the groove part 55 provided to the cylindrical part 22. That is to say, the open/close parts 60 at the two positions close the open part 51 with their convex parts 56 entering the groove part 55.

After the open part 51 is closed by the open/close part 60 to cover the wiring material W with the halved part 50 and the open/close parts 60, an adhesive tape is continuously wound from outside the tubular part 20 and the wiring material W. Thus, the tubular part 20 and the wiring material W are unified.

In the grommet 1 and the wire harness WH according to the second embodiment described above, the open/close part 60 is flexible and by the winding around the wiring material W, the open/close part 60 and the halved part 50 are formed into the tubular shape together. Thus, the open/close part 60 can be brought into close contact with the wiring material W. Thus, water entry between the open/close part 60 and the wiring material W can be suppressed more easily. As a result, the water stopping performance can be improved while the deterioration in workability in assembling the grommet 1 is suppressed more certainly.

In the state where the open part 51 is closed by the open/close parts 60 at the two positions on both sides of the halved part 50, the open/close parts 60 partially overlap with each other in the radial direction of the tubular part 20.

Therefore, the water entry into the insertion space part 40 from the outside of the tubular part 20 through a surface common to the open/close parts 60 can be suppressed. As a result, the water stopping performance can be improved more certainly.

Third Embodiment

The grommet 1 according to a third embodiment has a structure similar to that of the grommet 1 according to the second embodiment except that the open/close part 60 is provided at one position. Since the other structure is similar to that of the second embodiment, the description of the similar structure is omitted and the same component is denoted by the same reference symbol.

Figure 10:
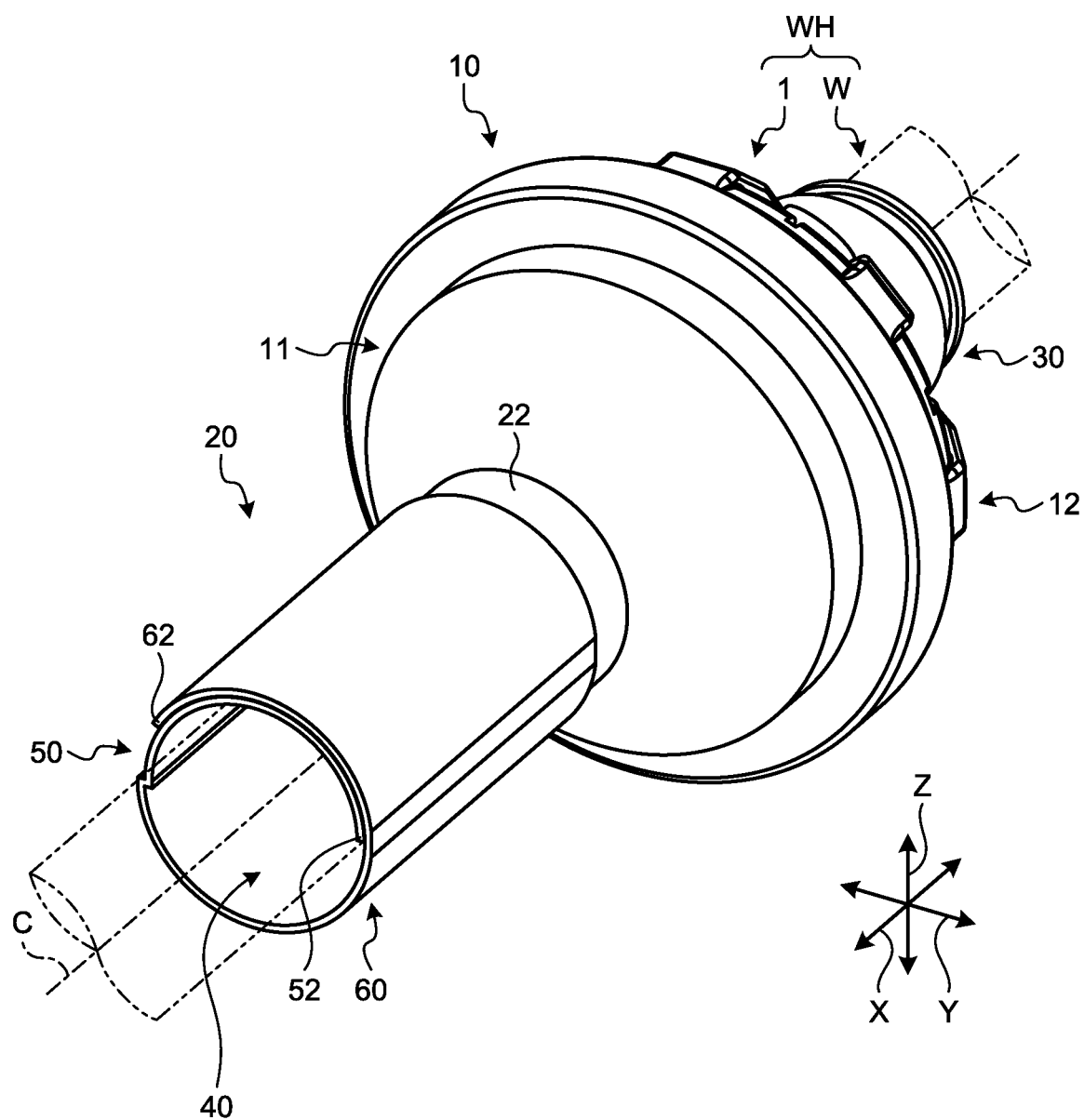
FIG. 10 is a perspective view illustrating a grommet according to a third embodiment.

FIG. 10 is a perspective view of the grommet 1 according to the third embodiment. In a manner similar to the structure of the grommet 1 according to the second embodiment, the grommet 1 according to the third embodiment includes the main body part 10 and the tubular part 20, and the tubular part 20 includes the halved part 50, the open part 51, and the open/close part 60 with flexibility. Among these components, the open/close part 60 is disposed only on one end side of the halved part 50 in the circumferential direction of the tubular part 20, and when the open part 51 is closed, the open/close part 60 is disposed on the outside in the radial direction of the halved part 50 with the large overlapping amount in the circumferential direction. Specifically, the open/close part 60 overlaps with the halved part 50 by 90° or more to the outside of the halved part 50 in the circumferential direction with the central axial line C as the center. That is to say, the open/close part 60 overlaps with the halved part 50 in a manner that the position of the end part 62 in a direction corresponding to the circumferential direction and the position of the end part 52 of the halved part 50 in the circumferential direction are separated by 90° or more in the circumferential direction with the central axial line C as the center.

Figure 11:
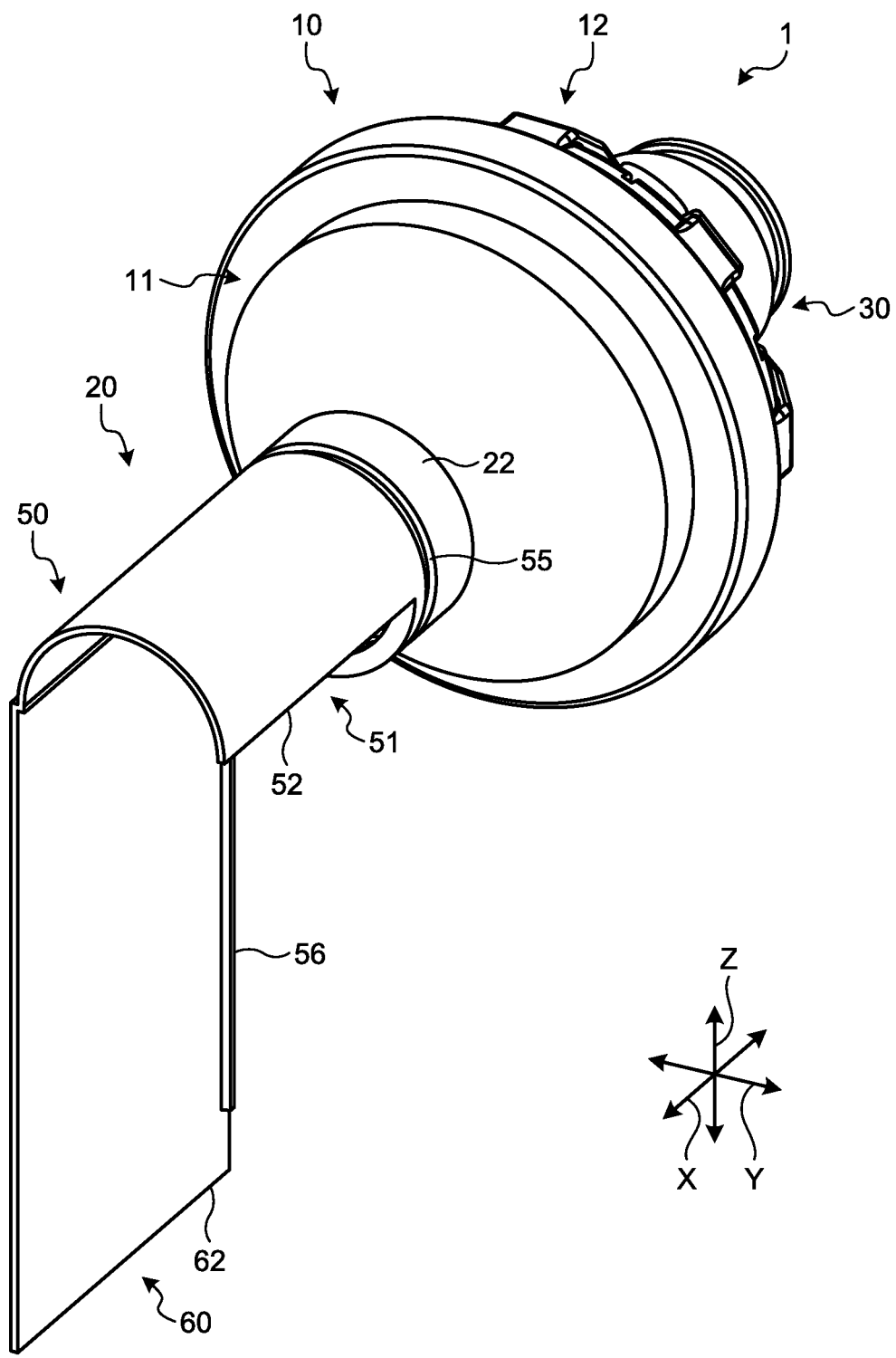
FIG. 11 is a perspective view illustrating a state in which an open/close part illustrated in FIG. 10 is open.
Figure 12:
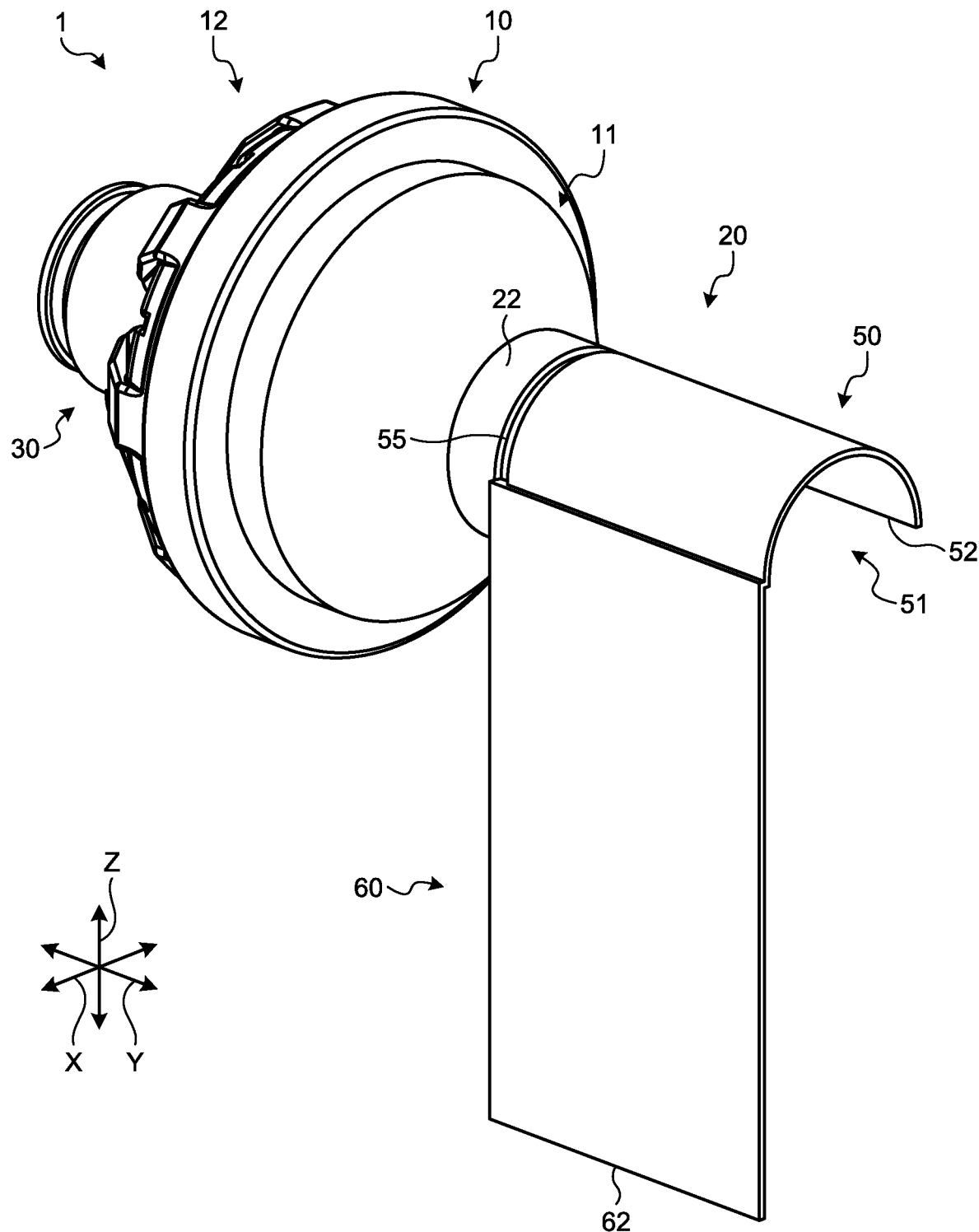
FIG. 12 is a perspective view illustrating a state in which the open/close part illustrated in FIG. 10 is open.

FIG. 11 and FIG. 12 are perspective views in which the open/close part 60 in FIG. 10 is open. In the grommet 1 according to the third embodiment, the open/close part 60 is formed to have the plate shape with the flexibility, which is similar to the structure according to the second embodiment. The different point from the second embodiment is that the open/close part 60 is positioned only on one end side of the halved part 50 in the circumferential direction of the tubular part 20 and therefore, the open/close part 60 in the circumferential direction of the tubular part 20 is longer than the open/close part 60 according to the second embodiment. In addition, in the third embodiment, the open/close part 60 overlaps with the halved part 50 by more than or equal to 90°; therefore, the length of the open/close part 60 in the circumferential direction of the tubular part 20 is the length corresponding to the length of 270° or more in the circumferential direction of the tubular part 20.

The groove part 55 provided to the cylindrical part 22 becomes longer as the open/close part 60 overlaps more with the halved part 50, and the groove part 55 is formed along substantially the entire circumference of the cylindrical part 22.

In the third embodiment, when the wiring material W is inserted into the grommet 1, the wiring material W is inserted, with the open part 51 opened by the open/close part 60. Thus, the part of the tubular part 20 that is tubular can be shortened in the axial direction X, and the wiring material W can be inserted more easily.

Figure 13:
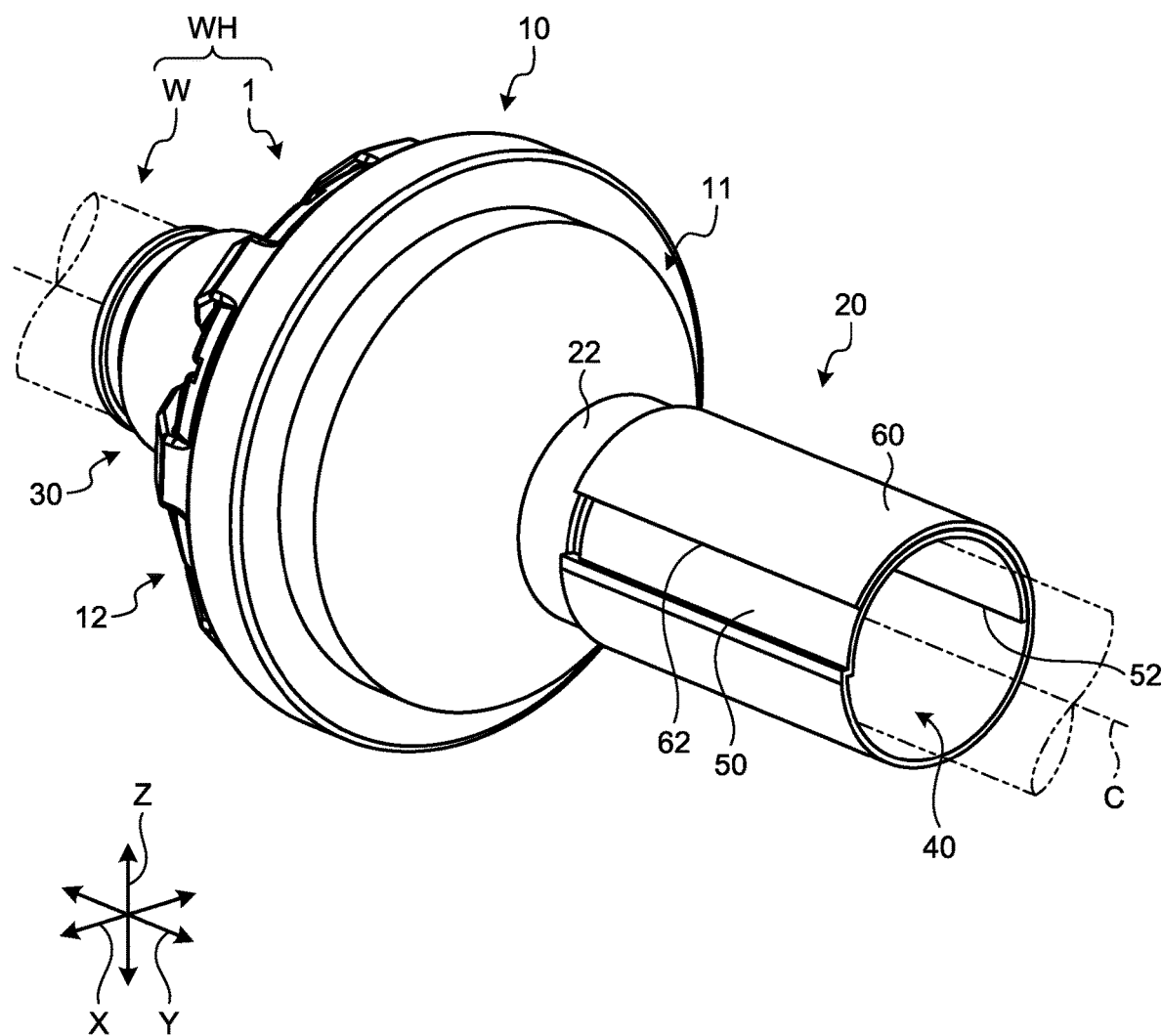
FIG. 13 is a perspective view illustrating a state in which the open/close part illustrated in FIG. 12 is closed.

After the wiring material W is inserted into the insertion space part 40 of the grommet 1, the open part 51 is closed by the open/close part 60. FIG. 13 is a perspective view in which the open/close part 60 illustrated in FIG. 12 is closed. In the third embodiment, when the open part 51 is closed by the open/close part 60, the open/close part 60 with flexibility is bent along the circumferential direction of the tubular part 20 and wound around the wiring material W. Thus, the open/close part 60 and the halved part 50 are formed into the tubular shape together and the open part 51 is closed by the open/close part 60. Therefore, since the part of the grommet 1 that is tubular in the axial direction X becomes long, the wiring material W can be covered with the large length and thus, a wider area of the wiring material W can be covered with the grommet 1.

When the open/close part 60 is closed, not just the open part 51 is closed but also the open part 51 is overlapped with the halved part 50 on the outside in the radial direction of the halved part 50. Here, since the open part 51 is overlapped with the halved part 50 by 90° or more, a large part of the halved part 50 can be covered from the outside of the halved part 50.

In addition, when the open part 51 is closed by the open/close part 60, the convex part 56 of the open/close part 60 enters the groove part 55 in the cylindrical part 22. In this case, the convex part 56 also enters the groove part 55 by 90° or more in the circumferential direction with the central axial line C as the center.

After the open part 51 is closed by the open/close part 60 to cover the wiring material W with the halved part 50 and the open/close part 60, an adhesive tape is continuously wound from outside the tubular part 20 and the wiring material W. Thus, the tubular part 20 and the wiring material W are unified.

In the grommet 1 and the wire harness WH according to the third embodiment described above, one open/close part 60 with flexibility is provided. Therefore, by winding one open/close part 60 around the wiring material W, the open/close part 60 and the halved part 50 are formed into the tubular shape together. Thus, the open/close part 60 can be brought into close contact with the wiring material W. Thus, the water entry between the open/close part 60 and the wiring material W can be suppressed more easily. As a result, the water stopping performance can be improved while the deterioration in workability in assembling the grommet 1 is suppressed more certainly.

Moreover, the open/close part 60 overlaps in large amount with the halved part 50 when the open part 51 is closed, and in the third embodiment, the open/close part 60 overlaps by 90° or more in the circumferential direction. Thus, the range where the halved part 50 and the open/close part 60 are in close contact can be increased. Therefore, the water entry into the insertion space part 40 from the outside of the tubular part 20 through a surface common to the halved part 50 and the open/close part 60 can be suppressed. As a result, the water stopping performance can be improved more certainly.

In the first to the third embodiments described above, the groove part 55 is provided to the cylindrical part 22, and the convex part 56 is provided to the open/close part 60; however, the positions of the groove part 55 and the convex part 56 may be opposite. That is to say, the groove part 55 may be provided to the open/close part 60, and the convex part 56 may be provided to the cylindrical part 22. It is only necessary that the groove part 55 is provided to one of the cylindrical part 22 and the open/close part 60, and the convex part 56 is provided to the other.

In a reference example, the member that covers the wiring material W, such as a tube or a boot, may be a structure including the halved part 50 and the open/close part 60 as typified by the tubular part 20 in the grommet 1 according to the first to the third embodiments.

The grommet and the wire harness according to the embodiments of the present invention described above are not limited to the aforementioned embodiments and various changes are possible in the scope of claims.

The grommet and the wire harness according to the embodiments of the present invention may have a combination of the components described in the embodiments and modifications.

The grommet and the wire harness according to the present embodiments include the main body part and the tubular part. The tubular part includes the halved part that is formed to have the shape of a part of the tubular part in the circumferential direction, the open part where the inside of the tubular part is open at the position except the position where the halved part is formed in the circumferential direction, and the open/close part that is formed continuing from the halved part and is able to open and close the open part. Thus, by keeping the open/close part open when the grommet is attached to the wiring material, the grommet can be attached in the state where the part that is tubular in the tubular part is shortened. Thus, the attachment is facilitated. After the grommet is attached to the wiring material, the open/close part is closed, so that the wiring material can be covered in the state where the part of the tubular part that is tubular is extended long; thus, the water stopping performance can be improved. As a result, the effect of the waterproof performance can be improved while the deterioration in workability in assembling the grommet is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
   a main body part that is fitted to a penetration hole penetrating an attachment target along an axial direction, stops water at the penetration hole, and has a wiring material inserted thereinto along the axial direction; and
   a tubular part that is unified with the main body part so as to have a tubular shape, and has the wiring material inserted thereinto along the axial direction, wherein
   the tubular part includes:
      a halved part that is formed to have a shape of a part of the tubular part in a circumferential direction;
      an open part where an inside of the tubular part is open at a position except a position where the halved part is formed in the circumferential direction;
      an open/close part that is formed continuing from the halved part in the circumferential direction and is able to open and close the open part:
      a cylindrical part positioned between the main body part and the halved part;
      a groove part formed along the circumferential direction; and
      a convex part that is formed along the circumferential direction and enters the groove part in the state where the open part is closed by the open/close part, and
   the groove part is provided to one of the cylindrical part and the open/close part and the convex part is provided to the other.

2. The grommet according to claim 1, wherein
   the open/close part is formed to have a halved shape corresponding to the open part.

3. The grommet according to claim 1, wherein
   the open/close part has flexibility and, by being wound around the wiring material, the open/close part is formed into the tubular shape together with the halved part.

4. The grommet according to claim 1, wherein
   the open/close part overlaps partially with the halved part in a radial direction of the tubular part in a state where the open part is closed.

5. The grommet according to claim 2, wherein
   the open/close part overlaps partially with the halved part in a radial direction of the tubular part in a state where the open part is closed.

6. The grommet according to claim 3, wherein
   the open/close part overlaps partially with the halved part in a radial direction of the tubular part in a state where the open part is closed.

7. The grommet according to claim 1, wherein
   the open/close part is one of open/close parts disposed on both sides of the halved part in the circumferential direction, and
   the open/close parts disposed on both sides of the halved part overlap with each other partially in the radial direction of the tubular part in a state where the open part is closed.

8. The grommet according to claim 1, wherein
   the main body part includes a first expansion part formed to have an annular shape that expands outward along the axial direction and is connected to the tubular part.

9. The grommet according to claim 1, further comprising:
   a second tubular part that is unified with the main body part so as to have a tubular shape with a central axis extending along the axial direction, and has the wiring material inserted thereinto along the axial direction, wherein
   the second tubular part protrudes from the main body to a side opposite to the tubular part.

10. The grommet according to claim 9, wherein
    the main body part includes a first expansion part and a second expansion part each formed to have an annular shape that expands outward along the axial direction, wherein
    the first expansion part is connected to the tubular part and the second expansion part is connected to the second tubular part, and wherein
    the first expansion part and the second expansion part face each other with a space therebetween along the axial direction and are unified at an outer peripheral part of the main body part.

11. The grommet according to claim 1, wherein the groove part is formed along the circumferential direction of the tubular part in a part of the cylindrical part where the cylindrical part overlaps with the open/close part in the axial direction.

12. The grommet according to claim 11, wherein
    the convex part is formed on an inner peripheral surface side of the open/close part where the open/close part overlaps with the cylindrical part in the axial direction.

13. A wire harness comprising:
    a wiring material having conductivity; and
    a grommet provided to the wiring material, wherein the grommet includes:

a main body part that is fitted to a penetration hole penetrating an attachment target along an axial direction, stops water at the penetration hole, and has the wiring material inserted thereinto along the axial direction; and a tubular part that is unified with the main body part so as to have a tubular shape, and has the wiring material inserted thereinto along the axial direction, the tubular part includes:

a halved part that is formed to have a shape of a part of the tubular part in a circumferential direction;

an open part where an inside of the tubular part is open at a position except a position where the halved part is formed in the circumferential direction;

an open/close part that is formed continuing from the halved part in the circumferential direction and is able to open and close the open part;

a cylindrical part positioned between the main body part and the halved part;

a groove part formed along the circumferential direction; and a convex part that is formed along the circumferential direction and enters the groove part in the state where the open part is closed by the open/close part, and the groove part is provided to one of the cylindrical part and the open/close part and the convex part is provided to the other.

14. A grommet comprising:

a main body part that is fitted to a penetration hole penetrating an attachment target along an axial direction, stops water at the penetration hole, and has a wiring material inserted thereinto along the axial direction; and a tubular part that is unified with the main body part so as to have a tubular shape, and has the wiring material inserted thereinto along the axial direction, wherein the tubular part includes:

a halved part that is formed to have a shape of a part of the tubular part in a circumferential direction;

an open part where an inside of the tubular part is open at a position except a position where the halved part is formed in the circumferential direction; and an open/close part that is formed continuing from the halved part in the circumferential direction and is able to open and close the open part, the open/close part is one of open/close parts disposed on both sides of the halved part in the circumferential direction, and the open/close parts disposed on both sides of the halved part overlap with each other partially in the radial direction of the tubular part in a state where the open part is closed.

* * * * *